Patented Oct. 31, 1939

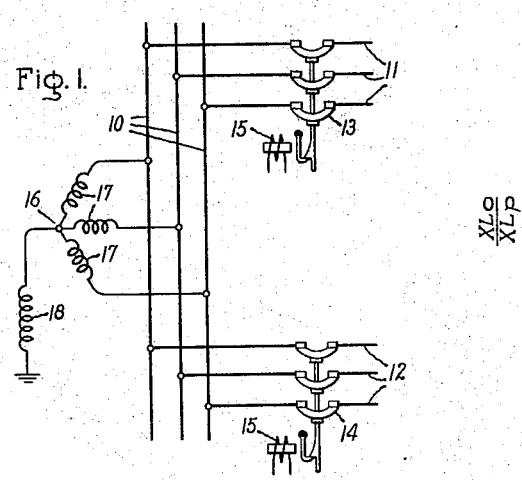
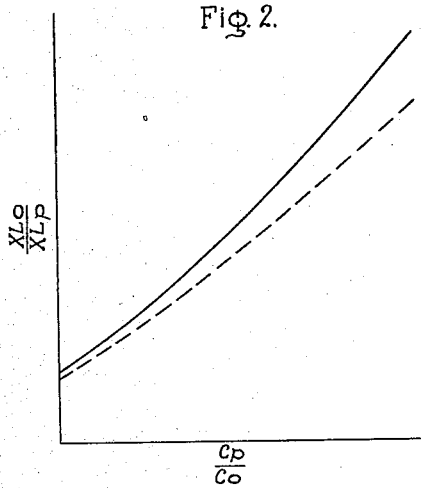
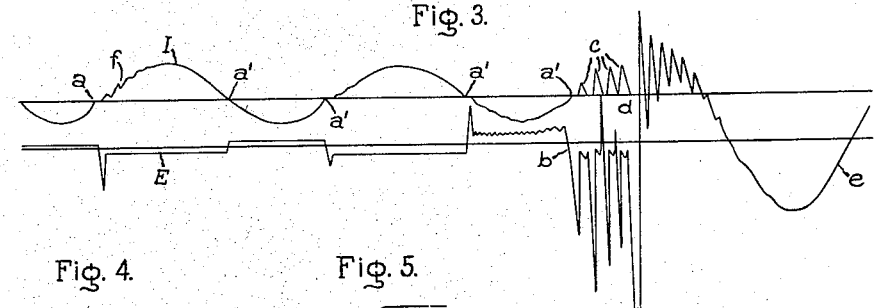
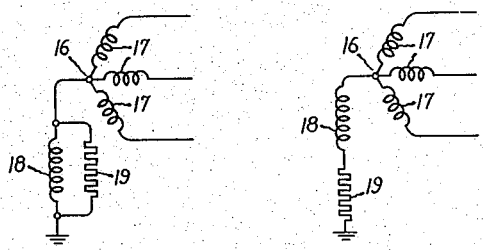
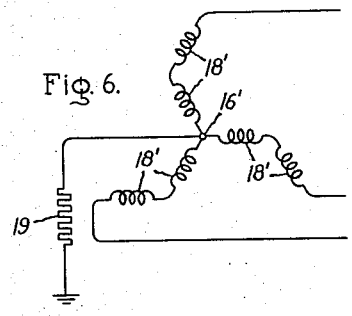
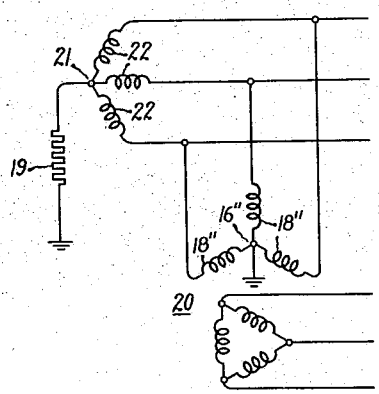
Inventor:
Charles Concordia,
by Harry E. Dunham
His Attorney.

2,178,420

UNITED STATES PATENT OFFICE 2,178,420

PROTECTION OF ALTERNATING CURRENT ELECTRIC SYSTEMS

Charles Concordia, Schenectady, N. Y., assignor to General Electric Company, a corporation of New York Application March 29, 1939, Serial No. 264,761

10 Claims. (Cl. 175—294)

My invention relates to improvements in the protection of alternating current electric systems and more particularly the protection of alternating current electric systems which have one or more impedance connections to ground through a neutral point or points.

The usual operation of a circuit breaker in opening a faulted alternating current circuit consists in carrying the fault current more or less continuously after the contacts have parted until, after a certain number of cycles and at a zero point of the current wave, the current is completely interrupted. The arc drop is usually assumed to be so small that it has no great effect on the fault current. Under these conditions, interruption is accompanied by a voltage oscillation at the breaker terminals, the voltage rising from zero more or less steeply, depending on the circuit natural frequencies and damping, to a value which may in the limit reach two times normal crest voltage.

However, in some cases, such as the interruption of the charging current of an open transmission line or cable and the interruption of faults involving ground on systems having relatively high impedance connections to ground through neutral points, its has been observed that the current is not simply interrupted just once. Instead, after a first interruption, the arc restrikes and may or may not be cleared during the subsequent current oscillations. If it does reclear during its oscillatory period, the resulting recovery voltage is no longer limited to two times normal since clearing is now from a transient condition, but may instead rise to some value greater than two times normal, depending on the point at which restriking occurred, on the circuit natural frequencies and damping, and on the circuit arrangement. Restriking may again take place during this abnormal recovery voltage oscillation, resulting in a second possible reclearing and possibly even higher voltages. Under particularly severe circuit conditions, such successive restriking and reclearing may take place many times in a normal half-cycle with consequent very high recovery voltages.

In accordance with my invention, I prevent these dangerous recovery voltages by an improved impedance type of grounding arrangement such that, regardless of the point on the initial recovery voltage at which the arc restrikes in a circuit interrupting operation following a fault involving ground, the resulting current oscillation cannot pass through a zero value. This and other objects of my invention will appear in more detail hereinafter.

This application is a continuation-in-part of my copending application, Serial No. 246,171, filed December 16, 1938, for Protection of alternating current electric systems, the subject matter of said prior application being incorporated in this application together with additional subject matter.

My invention will be better understood from the following description when considered in connection with the accompanying drawing, and its scope will be pointed out in the appended claims.

In the accompanying drawing, Fig. 1 illustrates diagrammatically an embodiment of my invention as applied to an alternating current electric system; Fig. 2 is a curve diagram explanatory of my invention; Fig. 3 is an oscillogram illustrating the build up of recovery voltages during a circuit interrupting operation of an alternating current circuit; and Figs. 4, 5, 6, and 7 illustrate diagrammatically modifications of the embodiment of my invention shown in Fig. 1.

For the purpose of illustrating my invention, I have shown in Fig. 1 a part of a polyphase alternating current electric system as comprising a bus 10 and two transmission lines 11 and 12 connected thereto by suitable circuit interrupting means, such as latched-closed circuit breakers 13 and 14, respectively. These may be provided with suitable tripping means illustrated as comprising trip coils 15. The bus 10 is shown as having a connection to ground through a neutral point 16 which may be the common point of the star connected windings 17 of a power transformer, the neutral of a generator, or otherwise as is well known to the art. The ground connection includes an impedance device 18 which in Fig. 1 is illustrated simply as an inductance. In accordance with my invention, this impedance device is so proportioned that, regardless of the point at which the arc restrikes during the opening of one of the circuit breakers 13, 14, to clear a ground fault, for example, the resulting current oscillation cannot pass through zero in advance of the normal zero value of the system current.

Referring now to the oscillogram shown in Fig. 3, curves I and E represent, respectively, the current and voltage conditions during a circuit interrupting operation. Thus, beginning at the left, the circuit breaker contacts have parted and at $a$ the current reaches a zero value followed by a rise in voltage causing the arc to restrike in a current oscillation $f$ that appears in the second half-cycle of the current wave. This oscillatory portion of the current wave, however, does not pass through zero. Successive restrikings follow with the system current passing through its normal zero value $a'$ until at $b$ the recovery voltages begin to reach high values and the successive half waves $c$ of the current oscillation in a normal half-cycle of the normal frequency or power current tend to cross the current wave axis or pass through zero, and are interrupted at each zero value. The current is eventually interrupted at $d$ and the voltage oscillates until it becomes practically normal as at $e$.

In order to avoid the overvoltages consequent upon the restroking over that portion of the interrupting operation wherein the current oscillates to zero at a frequency greater than the normal frequency of the system power current as at $c$ in Fig. 3, I suitably proportion the impedance of the connection to ground through the neutral in dependence on the relative values of the zero phase sequence capacitance $C_0$ and the positive phase sequence capacitance $C_p$ of the system. Thus, if the positive phase sequence capacitance of the system is equal to or greater than the zero phase sequence capacitance, corresponding approximately to the usual cable or overhead transmission system, these successive restrikings may be avoided, in accordance with my invention, by making the ratio of the zero phase sequence inductance $X_{Lo}$ to the positive phase sequence inductance $X_{Lp}$ of the system less than 10. If the effective zero sequence capacitance $C_0$ of the system is greater than the positive phase sequence capacitance $C_p$, then the maximum permissible ratio of the zero phase sequence and positive phase sequence inductances of the system is decreased. Thus, in accordance with my invention, at the limit with the ratio of $C_p$ to $C_0$ equal to zero, which may be approached in the case of a number of generators which are substantially independent electrically except for a common neutral bus, the critical ratio of the zero phase sequence and positive phase sequence inductive reactances of the system is equal to $$\frac{3\pi}{2}$$

or approximately 4.7. The zero phase sequence capacitance $C_0$ may in some cases exceed the positive phase sequence capacitance $C_p$ as in the case of the reactance grounding of generator neutral points. Fig. 2, for example, shows the critical ratio between the zero phase sequence inductance and the positive phase sequence inductance of the system as a function of the ratio of the positive phase sequence to the zero phase sequence capacitances of the system. The solid line curve is for systems having relatively small capacitance and the broken line curve is for ratios of zero phase sequence capacitive reactance $X_{Co}$ to positive phase sequence inductive reactance $X_{Lp}$ of the system equal to or less than 600. Thus, if the ratio of the zero phase sequence inductance to the positive phase sequence inductance of the system is so established by suitably proportioning the impedance of the ground connection that the ratio falls under these solid or broken lines for the system in question, restrikings leading to dangerous overvoltages will be avoided.

If it is desired to have the impedance of the ground connection greater than the critical value, as pointed out above, successive restrikings may still be prevented, in accordance with my invention, by the use of a resistance connected in circuit with the neutral grounding device 18. Thus, for example, as shown in Fig. 4, a resistance 19 may be connected in parallel with the neutral inductance 18. The parallel neutral resistance must be low enough to prevent by its damping action the restriking current oscillation from reaching zero in advance of the normal zero value of the system current. In addition to this, it also reduces the initial recovery voltage. The required value of parallel resistance is always somewhat greater than that necessary for critical damping of the ground or zero phase sequence circuit, the difference depending on the circuit natural frequencies and on both the ratio of zero phase sequence to positive phase sequence inductive reactances of the system and the ratio of zero sequence to positive sequence capacitances of the system. A practical and conservative damping value for the resistance 19 is obtained by making the ohmic value of this resistance equal to one-half the square root of the product of the inductive reactance $X_{Ln}$ of the ground connection and the capacitive reactance $X_{Cn}$ of the system. $X_{Ln}$ is approximately one-third of the zero phase sequence inductive reactance for a three-phase system and $X_{Cn}$ is also one-third of the zero phase sequence capacitive reaction for a three-phase system. From this, it will be clear that the power or kw. rating of the required resistance for a given reactance of the ground connection is approximately proportional to the square root of the system capacitance to ground.

Instead of connecting the resistance 19 in parallel with the inductive grounding device 18, it may be connected in series as shown in Fig. 5. In this case a very conservative ohmic value for the resistance is equal to twice the product of the inductive reactance $X_{Ln}$ of the ground circuit and the capacitive reactance $X_{Cn}$ of the ground circuit. By ground circuit, I mean the circuit through the system ground connection and including a conductor faulted to ground. A closer approach to the required value of series resistance can be determined with ordinary circuit theory by calculating the current oscillation following a restrike at the maximum value of the initial recovery voltage, as will be obvious to those skilled in the art. The resistance is then chosen so as to prevent the current oscillation from reaching zero in advance of the normal zero value of the system current.

In some cases the inductive connection to ground may be made through the neutral 16' of the windings 18' of a zig-zag grounding transformer, as shown in Fig. 6. In such cases it is not convenient to use a resistance in parallel with the grounding transformer. However, there may be used a series connected resistor 19 which, as before, is so chosen as to prevent the current oscillation from reaching zero in advance of the normal zero value of the system current.

Cases may arise wherein a resistance of the necessary value in series with the grounding inductance would so limit the ground fault current as to impair relaying. In such cases the resistance may be effectively connected in parallel with the grounding inductance, even though this be a transformer, if a second neutral point is available through a relatively low impedance. Thus, referring to Fig. 7, the grounding inductance may be a relatively high reactance transformer 20 whose star connected windings 18'' are grounded at the neutral 16''. The parallel resistance may then be the resistance 19 which is connected between ground and another neutral 21 of relatively low reactance windings 22 as compared with the windings 18''.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In a polyphase alternating current circuit having a neutral point, means for interrupting said circuit, and a connection to ground through said neutral point including an inductance and having an impedance so proportioned that regardless of the point on the initial recovery voltage at which the arc restrikes upon the opening of said circuit interrupting means on the occurrence of a fault involving ground the resulting current oscillation cannot pass through zero in advance of the normal zero value of the circuit current.

2. In a polyphase system having a neutral point and a zero phase sequence capacitance equal to or less than its positive phase sequence capacitance, a connection to ground through said neutral point having an inductance so proportioned that the ratio of the zero phase sequence inductive reactance of the system to the positive phase sequence inductive reactance of the system is less than 10.

3. In a polyphase system having a neutral point and a zero phase sequence capacitance substantially larger than the positive phase sequence capacitance, a connection to ground through said neutral point having an inductance so proportioned that the ratio of the zero phase sequence inductive reactance of the system to the positive phase sequence inductive reactance of the system is less than $$\frac{3\pi}{2}$$

4. In a polyphase alternating current circuit having a neutral point, means for interrupting said circuit, a connection to ground through said neutral point having an inductance such that a current oscillation due to restriking of the arc following an opening of said interrupting means on the occurrence of a fault involving ground can pass through zero in advance of the normal zero value of the circuit current, and a damping resistance connected in circuit with said inductive connection and proportioned to prevent the current oscillation from reaching zero in advance of the normal zero value of the circuit current regardless of the point on the initial recovery voltage at which the arc restrikes.

5. In a polyphase system having a neutral point and a zero phase sequence capacitance substantially larger than its positive phase sequence capacitance, an inductance connected between said neutral point and ground and so proportioned that the ratio of the zero phase sequence inductive reactance of the system to the positive phase sequence inductive reactance of the system is greater than $$\frac{3\pi}{2}$$

and a resistance connected in parallel with said inductance and having an ohmic value approximately equal to one-half the square root of the product of the inductive and capacitive reactances of the ground circuit.

6. In a polyphase system having a neutral point and a zero phase sequence capacitance substantially larger than its positive phase sequence capacitance, a connection to ground through said neutral point having an inductive reactance such that the ratio of the zero phase sequence inductive reactance of the system to the positive phase sequence inductive reactance of the system is greater than $$\frac{3\pi}{2}$$

and a resistance connected in circuit with said ground connection and having an ohmic value proportional to the square root of the product of the inductive and capacitive reactances of the ground circuit.

7. In a polyphase system having a neutral point and a zero phase sequence capacitance substantially larger than its positive phase sequence capacitance, means for interrupting said system, a connection to ground through said neutral point having an inductive reactance such that the ratio of the zero phase sequence inductive reactance to the positive phase sequence inductive reactance of the system is greater than $$\frac{3\pi}{2}$$

and a resistance connected in series in said ground connection and having an ohmic value proportioned to prevent the current oscillation due to restriking of the arc following an opening of said interrupting means on the occurrence of a fault involving ground from reaching zero in advance of the normal zero value of the system current regardless of the point on the initial recovery voltage at which the arc restrikes.

8. In a polyphase alternating current circuit having a neutral point, means for interrupting said circuit and a connection to ground through said neutral point including impedance means so proportioned that regardless of the point on the initial recovery voltage at which the arc restrikes upon the opening of said circuit interrupting means on the occurrence of a fault involving ground the resulting current oscillation cannot pass through zero in advance of the normal zero value of the circuit current.

9. In a polyphase alternating current circuit, means for interrupting said circuit, a connection from said circuit to ground through a neutral point having an inductance such that a current oscillation due to restriking of the arc following an opening of said interrupting means on the occurrence of a fault involving ground can pass through zero in advance of the normal zero value of the circuit current, and a damping resistance effectively connected in parallel with said inductive connection and proportioned to prevent the current oscillation from reaching zero in advance of the normal zero value of the circuit current regardless of the point on the initial recovery voltage at which the arc restrikes.

10. In a polyphase alternating current circuit having a neutral point, means for interrupting said circuit, and a connection to ground through said neutral point including a resistance and so proportioned electrically that regardless of the point on the initial recovery voltage at which the arc restrikes upon the opening of said circuit interrupting means on the occurrence of a fault involving ground the resulting current oscillation cannot pass through zero in advance of the normal zero value of the circuit current.

CHARLES CONCORDIA.